US005774204A

United States Patent [19]

Suzuki et al.

[11] Patent Number: 5,774,204

[45] Date of Patent: Jun. 30, 1998

[54] HEAT DEVELOPMENT DEVICE HAVING SHEET PRESSING MEMBERS AND WIDE HEATING PLATES

[75] Inventors: Kenichi Suzuki, Isehara; Keiji Ohkoda, Yokohama; Kazumasa Matsumoto, Yokohama; Satoshi Shimizu, Yokohama, all of Japan

[73] Assignee: Canon Kabushiki Kaisha, Tokyo, Japan

[21] Appl. No.: 609,783

[22] Filed: Mar. 4, 1996

[30] Foreign Application Priority Data

Mar. 2, 1995 [JP] Japan .................................... 7-043105

[51] Int. Cl.[6] ........................................ G03B 27/32

[52] U.S. Cl. ........................................ 355/27; 355/100

[58] Field of Search .................... 355/27, 100; 430/151; 396/575

[56] References Cited

U.S. PATENT DOCUMENTS

| | | | |
|---|---|---|---|
| 3,621,201 | 11/1971 | Crane et al. | 219/388 |
| 4,367,948 | 1/1983 | Suzuki | 399/48 |
| 4,788,574 | 11/1988 | Matsumoto et al. | 399/300 |
| 5,528,338 | 6/1996 | Kobayashi et al. | 355/27 |

FOREIGN PATENT DOCUMENTS

| | | |
|---|---|---|
| 0108615 | 5/1984 | European Pat. Off. . |
| 0679946 | 11/1995 | European Pat. Off. . |
| 2342360 | 3/1974 | Germany . |
| 2716705 | 10/1978 | Germany . |
| 53-34515 | 3/1978 | Japan . |
| 61-184544 | 8/1986 | Japan . |
| 61-184545 | 8/1986 | Japan . |
| 63-85742 | 4/1988 | Japan . |
| 63-106750 | 5/1988 | Japan . |
| 63-178232 | 7/1988 | Japan . |
| 63-178233 | 7/1988 | Japan . |
| 63-200148 | 8/1988 | Japan . |
| 1-270054 | 10/1989 | Japan . |

*Primary Examiner*—Nestor R. Ramirez
*Attorney, Agent, or Firm*—Fitzpatrick, Cella, Harper & Scinto

[57] ABSTRACT

A heat development device for thermally developing a latent image formed on a sheet includes a sheet guide means in the form of a plate and a heating means for heating the sheet guide means. The heating means has a width more than a width of the sheet guide means and has both ends in a width direction each of which extends outwardly from a corresponding end of the sheet guide means. The heating means may preferably be divided into at least three portions which are controllable independently. The heat development device may preferably further includes a sheet pressing means for pressing the sheet against the sheet guide means. The heat development device is effective in improving a thermal distribution of the sheet guide means to provide an image having a uniform image density formed on the sheet when used in an image recording apparatus.

22 Claims, 11 Drawing Sheets

HEAT DEVELOPMENT DEVICE HAVING SHEET PRESSING MEMBERS AND WIDE HEATING PLATES

FIELD OF THE INVENTION AND RELATED ART

The present invention relates to a heat (thermal) development device for thermally developing a latent image formed on a sheet, and particularly to a heat development device suitable for heat development treatment of a sheet having thereon a medical image recorded by a laser image forming apparatus (laser imager) performing recording by using a laser beam. The present invention also relates to an image recording apparatus using the heat development device.

A laser imager is an apparatus for recording an image signal obtained by using a diagnosis apparatus utilizing, e.g., CT (Computerized Tomogram) or MRI (Magnetic Resonance Imaging). In such an apparatus, an inputted image signal is converted into a laser beam intensity, and then a sheet is irradiated with (or exposed to) an intensity-modulated laser beam depending on an image density. The thus obtained exposed sheet is subjected to development treatment by using a development device to form an image sheet having thereon an image having a density gradation or a difference in tone.

Heretofore, a sheet for a medical image is required to provide a high gradation characteristic, so that a sheet to which a silver salt emulsion was applied (imaging sheet) was exposed to light or laser beam (hereinafter, simply referred to as "recorded or recording") in accordance with an intensity of light corresponding to a desired image density and the resultant sheet has then generally been subjected to a so-called dry development treatment wherein the sheet has been immersed in a developing solution and a fixing solution for a prescribed period of time to perform development treatment. Such a development treatment, however, required the use of a chemical liquid, such as a developing solution or a fixing solution thus resulting in a complicated process. Further, such a chemical liquid deteriorated with time after effecting a certain treatment to become unusable, thus requiring a replacement with new one. As a result, the old (used) chemical liquid was required to be discarded, thus threatening environmental contamination etc.

In order to solve the above difficulties, there has been proposed a sheet having thereon an applied silver salt emulsion which sheet has been subjected to heat treatment after recording to perform development in accordance with a so-called dry-type silver salt scheme as disclosed in Japanese Laid-Open Patent Application (JP-A) 53-34515. Further, various heat development devices applicable to such a dry-type silver salt scheme have been proposed in e.g., JP-A 63-85742, an embodiment of which is shown in FIG. 22. FIG. 22 shows a schematic sectional view of a heat development device as disclosed in JP-A 63-85742. Referring to FIG. 22, a heat development device 11 includes: a conveyance roller 13 for conveying a film 12 to be heated passing between the conveyance roller 13 and an opposing conveyance roller, a heater 14 for heating the conveyance roller 13, a guide plate (or plate for heating) 15 provided with an emboss-like unevenness at the surface contacting or facing the film 12, a heater 16 or heating the guide plate 15, a temperature detection means (not shown) for detecting temperatures of a roller and a guide plate, and a temperature control means (not shown) for controlling the temperatures of the roller and guide plate so as to provide a prescribed temperature, i.e., a development temperature (TD as shown in FIG. 23) to the film conveyed. More specifically, the film 12 enters the heat development device 11 from the right direction on the drawing and is sandwiched between and conveyed by the pair of conveyance rollers 13 toward the left direction on the drawing. During the conveyance of the film 12, the film 12 is supplied with heat from the rollers and the guide plates, thus performing heat development.

However, when the above heat development device is used in the laser imager as described above, the heat development device is accompanied with such a problem that in the above-mentioned developing process an irregularity in development (or locally irregular development) occurs, i.e., a portion of an image recorded with an identical intensity is developed with different image densities depending on films used. Such an irregularity in development or a difference in image density resulting from identical recording intensity between films used is a serious problem in the above-mentioned laser imager because particularly a medical image to be subjected to the diagnosis use is required to be formed on a sheet or film as a hard copy.

The reason why the above problem arises may be considered as follows.

First, a temperature change of a film in the heat development device as shown in FIG. 22 will be described.

FIG. 23 is a graph showing a temperature change of a film to be subjected to development treatment in respective positions corresponding to those in FIG. 22.

Referring to FIG. 23 (in combination with FIG. 22), the film has a room temperature (TR, e.g., 10°–30° C.) before entering the heat development device but after being subjected to recording. In the case of the above-described dry-type silver salt scheme, the film is then conveyed to a developing region and heated for a prescribed time (e.g., about 5–100 sec.) at a prescribed (development) temperature (e.g., in a certain temperature range (TD) between 100°–150° C. to perform heat development. Strictly speaking, the temperature range TD has a temperature range of, e.g., 1°–10° C. but herein is simply referred to as a development temperature (TD). After the heat development operation is cooled to a prescribed temperature (TL, e.g., 80°–100° C.) to terminate the progress of the heat development.

In the case of development-treating a film by using the heat development apparatus shown in FIG. 22, rollers and guide plate are heated in advance to be kept at a prescribed temperature TD necessary for development-treating the film. As described above, the film has a room temperature TR at the time of entering the development device from the right side on the drawing. Incidentally, according to heat (thermal) conduction theory, heat conduction due to air contact is very slowly and accordingly, heat conduction to the film is principally effected by solid contact, i.e., a contact of the film with a roller or a guide plate. Specifically, the film is first supplied with heat from pair of first rollers 13. However, even if the pair of rollers 13 are heated in advance to have a development temperature, the contact of the film with the rollers is substantially a linear contact and is made in a short time for respective portions of the film when the roller 13 is rotated in the direction of the arrow. As a result, the film as a whole fails to reach a prescribed temperature (TD). Thereafter, the film passes between the guide plates 15. In this instance, the respective portions of the film are supplied with heat from the guide plates during the passing of the film between the guide plates, thus being heated to the prescribed temperature (TD). The film is thereafter conveyed to the left side of the development device while being kept at the prescribed temperature (TD) and then is ejected therefrom.

FIG. 23 shows a temperature change during the above operation wherein a temperature of the film is plotted along the ordinate and the abscissa corresponds to respective positions of the sheet in the moving direction thereof (as those in FIG. 22). More specifically, a point a corresponds to the position from which the film enters the development device, a line b-b' corresponds to a section at which the film is sandwiched or disposed between the pair of first rollers 13, and a line c-d corresponds to a section at which the film is disposed between the first pair of guide plates 15. At a-b, the film has a room temperature which is slightly increased because the film is supplied with heat by air heat conduction. At b-b', the temperature of the film is quickly or sharply increased but fails to reach a TD because of a short contact time as described above. In this instance, if the rotation speed of the roller is lowered for ensuring a longer contact time, the number of developed films per unit time is decreased. At b'-c, the film is again supplied with heat by air heat conduction, so that the temperature of the film is only increased slightly. At c-d, the film is supplied with heat from the guide plates. At this time, the film is not pressed between the upper and lower guide plates but comes in contact with the lower guide plate due to its weight, so that the temperature of the film is not quickly increased as at the time of being sandwiched between the rollers but is gradually increased to reach the prescribed temperature TD in the vicinity of the point d.

FIG. 24 shows a schematic sectional view of an embodiment of a heat development device 11' in a film-feeding (-moving) direction. Referring to FIG. 24, the heat development device 11' includes a pair of guide plates 15, a film 12 disposed between the guide plates 15, a heater for heating the lower guide plate to a prescribed temperature, and a frame member 17 for supporting the guide plates 15. In the development device 11', if the guide plate 15 is not uniformly heated along the width of the film 12, uniform development is not performed along the width. Accordingly, it is preferred that the heater 16 is arranged to have a width closer to a film width thereby to heat the guide plate 15 uniformly in its width direction. However, in such an instance, the (lower) guide plate 15 shows a temperature distribution as shown in FIG. 25 wherein a temperature (t) of the guide plate is plotted along the ordinate and the abscissa represents respective positions corresponding to those of the guide plate shown in FIG. 24 in the width direction. For this reason, the resultant film is liable to provide a high (developed) image density at a central part thereof and a poor image density at both end portions (sections) thereof. This may be attributable to the following phenomenon. Heat conducted or transmitted from the heater to the guide plate is principally used for increasing the temperature of the guide plate, but a part of the heat is diffused into ambient air and another part of the heat is also diffused into the frame member 17 from the contact portion between the guide plate 15 and the frame member 17 as shown in the arrow (of FIG. 24). Incidentally, as described above, heat conduction to air is relatively performed slowly but heat conduction through the direct contact between the solid members (as shown in the arrows in FIG. 24) is quickly performed, so that the guide plate 15 causes a temperature gradient (or temperature change) in the width direction even if heat is equally conducted or transmitted from the heater 16 to the guide plate 15. As a result, the film subjected to heat development by using the heat development devices as shown in FIGS. 22 and 24 causes an irregularity in development (or a difference in image density).

SUMMARY OF THE INVENTION

An object of the present invention is to provide a heat development device capable of preventing an irregularity in development and to provide an image recording apparatus including the heat development device.

According to the present invention, there is provided a heat development device for subjecting a sheet having thereon a latent image (hereinafter, referred to as "imaging sheet") to heat development, comprising: sheet guide means in the form of a plate and heating means for heating the sheet guide means, wherein the heating means has a width (i.e., a length, of a heating portion of the heating means in its width direction perpendicular to a sheet conveyance (sheet-feeding) direction) more than a width (i.e., a (maximum) length of the sheet guide means in its width direction perpendicular to a sheet conveyance direction) of the sheet guide means and has both ends each of which extends outwardly from a corresponding end of the sheet guide means in a width direction.

According to the present invention, there is also provided a heat development device for thermally developing a latent image formed on a sheet, comprising: sheet guide means in the form of a plate, heating means for heating the sheet guide means, and sheet pressing means for contact-pressing a sheet against the sheet guide means at the time of conveying the sheet.

According to the present invention, there is further provided a heat development device for thermally developing a latent image formed on a sheet, comprising: a preliminary heating section and a heating section comprising sheet guiding means in the form of a plate and comprising heating means for heating the sheet guiding means, the preliminary heating section and the heating section being divided by a heat-shielding member.

According to the present invention, there is further provided a heat development device for thermally developing a latent image formed on a sheet, comprising: sheet guide means in the form of a plate for guiding a sheet, and heating means for heating the sheet guide means; wherein the heating means is divided into at least three portions including both end portions and a central portion and has a width as a whole more than a width of the sheet, the both end portions being located outwardly from a corresponding end of the sheet in a width direction and being controllable independent of a residual portion of the at least three portions.

According to the present invention, there is further provided an image recording apparatus, comprising: container means for containing an unused sheet, recording means for performing recording treatment wherein a latent image is formed on the unused sheet, and a heat development device for thermally developing a latent image formed on a sheet;

wherein the heat development device comprises sheet guide means in the form of a plate and heating means for heating the sheet guide means, and the heating means has a width more than a width of the sheet guide means and having both ends in a width direction each of which extends outwardly from a corresponding end of the sheet guide means.

According to the present invention, there is further provided an image recording apparatus, comprising: container means for containing an unused sheet, recording means for performing recording treatment wherein a latent image is formed on the unused sheet, and a heat development device for thermally developing a latent image formed on a sheet;

wherein the heat development device comprises sheet guide means in the form of a plate for guiding a sheet, and heating means for heating the sheet guide means, wherein the heating means is divided into at least three portions including both end portions and a central portion and has a width as a whole more than a width of the sheet, the both end portions being located outwardly from a corresponding end of the sheet in a width direction and being controllable independent of a residual portion of the at least three portions.

In the heat development device according to the present invention, the heating means has a longer width than a width of the sheet guide means,.whereby it is possible to provide the entire sheet guide means with a uniform heat (thermal) distribution, thus solving the problem of development irregularity (or non-uniform development). More specifically, in the present invention, the heating means having a longer width (than that of the sheet guide means) allows its heating portion to extend outwardly in its width direction from both ends of the sheet guide means, whereby thermally diffusion from the both ends of the sheet guide means can be prevented and an occurrence of temperature gradient of the sheet guide means can also be prevented. As a result, it is possible to realize a uniform heat development operation free from the development irregularity described above.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
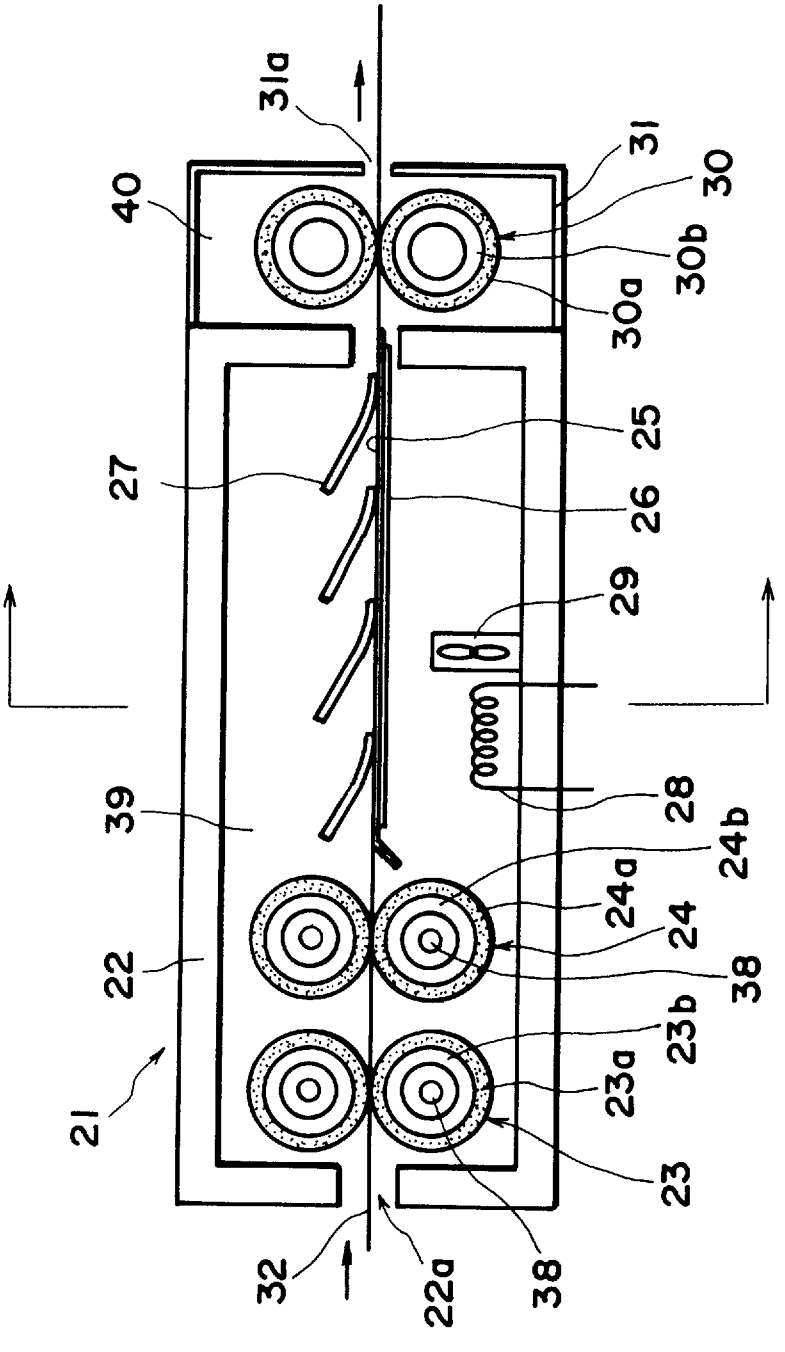
FIG. 1 is a schematic sectional view of an embodiment of the heat development device according to the present invention.

In the heat development device according to the present invention, the heating means for heating the sheet guide means is arranged to have a width (a length of a heating portion thereof in a widthwise direction perpendicular to a sheet conveyance direction) more than a width of the sheet guide means. In the present invention, the width of a heating portion of the heating means may preferably be longer than that of the sheet guide means by at least 20 mm, more preferably at least 40 mm. In this instance, the width of the heating portion (of the heating means) may preferably be longer that of the sheet guide means at both end portions of the heating portion by least 10 mm each, more preferably at least 20 mm each, respectively. In other words, the center of the heating portion of the heating means and that of the sheet guide means may preferably overlap with each other in a width direction.

Herein, the heating portion represents a portion of the heating means capable of applying heat to the sheet guide means.

Hereinbelow, preferred embodiments of the heat development device of the present invention will be described in detail with reference to the drawings. In the following, structural members (or elements) indicated by identical reference numerals represent identical members, unless otherwise expressly indicated.

FIG. 1 illustrates an embodiment of the heat development device of the present invention.

Referring to FIG. 1, a heat developing device (body) 21 includes a heat insulating member 22, a heating chamber surrounded by the heat insulating member to be thermally shielded from the output effectively, a cooling chamber 40, and a cover 31 for covering the cooling chamber 40. In the heat development device 21, an imaging sheet 32 as a heat development-type photosensitive material sheet, such as a dry (developable) silver salt film, on which a latent image is formed by imagewise exposure, can enter the heating chamber 39 from an inlet (opening) **22*a* provided to the heat insulating member 22 as shown in the left-hand arrow. The development device 21 includes a pair of first conveyance heating rollers 23 and a pair of second conveyance heating rollers 24 located on the inlet side and functioning as a preliminary heating means for the imaging sheet 32. Each of the rollers 23 and 24 includes an elastic member 23*a* or 24*a*, such as a silicone rubber, a hollow shaft 23*b* or 24*b* on which the elastic member 23***a* or 24*a* is applied and fixed, and a core bar heat 38. The hollow shafts 23*b* and 24*b* are each rotatably supported by a supporting member (not shown) and supplied with a driving force from a driving power supply (not shown) via a power transmission means (not shown), such as gear or a timing belt. Further, one of the shaft (or axis) of each pair of rollers 23 and 24 is rotatably field and the other shaft thereof is supplied with an appropriate pressing force from a member (not shown), whereby the other roller is pressed or abutted, whereby the other roller is pressed or abutted against the fixed roller. A the peripheral surface of each of the pair of rollers 23 and 24, a sensor (not shown) is disposed to make contact with the roller and detects temperature data to input a temperature control unit (not shown), so that the amount of heat generation the heater 38 can be controlled to keep a certain roller temperature. Further, it is possible to minimize a change or fluctuation in developing conditions by controlling the temperature of the inside of the rollers.

The development device 21 includes a heat guide plate 25 as a sheet guide means comprising a heat (or thermal) conductive (or transmission) material, such as aluminum. Under the heat guide plate 25, a planar heater 26 as a heating means covered with, e.g., a silicone rubber is fixed and secured. The heat guide plate 25 is fixed on a sheet conveyance passage by a member (not shown). Further, similarly as in the above-mentioned rollers, the heat guide plate 25 is controlled to have a prescribed temperature by a temperature sensor (not shown) for measuring the temperature thereof and a temperature control unit (not shown). On the imaging sheet 32, a sheet pressing means 27, e.g., composed of an elastic member in an elongation or strip form (in the width direction perpendicular to the sheet conveyance direction), comprising high heat-resistant resin is disposed. In this embodiment, the sheet pressing member 7 may have structures shown in FIGS. 2–4 described hereinafter in detail. Below the planar heater 26, a heater 28 for raising the temperature of air within the heat chamber 39 is controlled to have a prescribed heat release value by using a temperature sensor (not shown) and a temperature control unit (not shown). The internal air of the heating chamber 39 is circulated to make uniform a temperature distribution within the heating chamber 39.

The cooling chamber 40 includes a pair of conveyance cooling rollers 30 located on the side of an minimum outlet 31*a* and composed of a hollow shaft 30*b* and an elastic member 30*a* surrounding the hollow shaft 30*b*. The pair of cooling rollers 30 is rotatably supported by a supporting member (not shown) and driven under pressure similarly as in the case of the above-mentioned pair of heating rollers 23 and 24. The minimum outlet 31*a* is provided to the cover 31 for the cooling chamber 40 and from which the imaging sheet 32 after the heat development operation can be ejected or discharged outside the heat development device 21. In the cooling chamber 40, an air intake or exhaust fan (not shown) is disposed so as to air-cool the internal air and the cooling rollers 30.

In the heat development device 21 as described above, it is necessary to provide a large contact area and large contact pressure between the imaging sheet 32 and the heat guide plate 25 in order to efficiently perform heat conduction from the heat guide plate 25 to the imaging sheet 32. If the sheet pressing means 27 is omitted from the heat development device 21 of FIG. 1 and the imaging sheet 32 is conveyed on the heat guide plate without a member for pressing the imaging sheet 32, a part of the imaging sheet 32 comes in contact with the heat guide plate 25 but another part of the imaging sheet 32 fails to make contact with the heat guide plate 25, thus resulting in non-uniform heat conduction. In the present invention, the sheet pressing means 27 allows uniform heat conduction with high efficiency.

Figure 2:
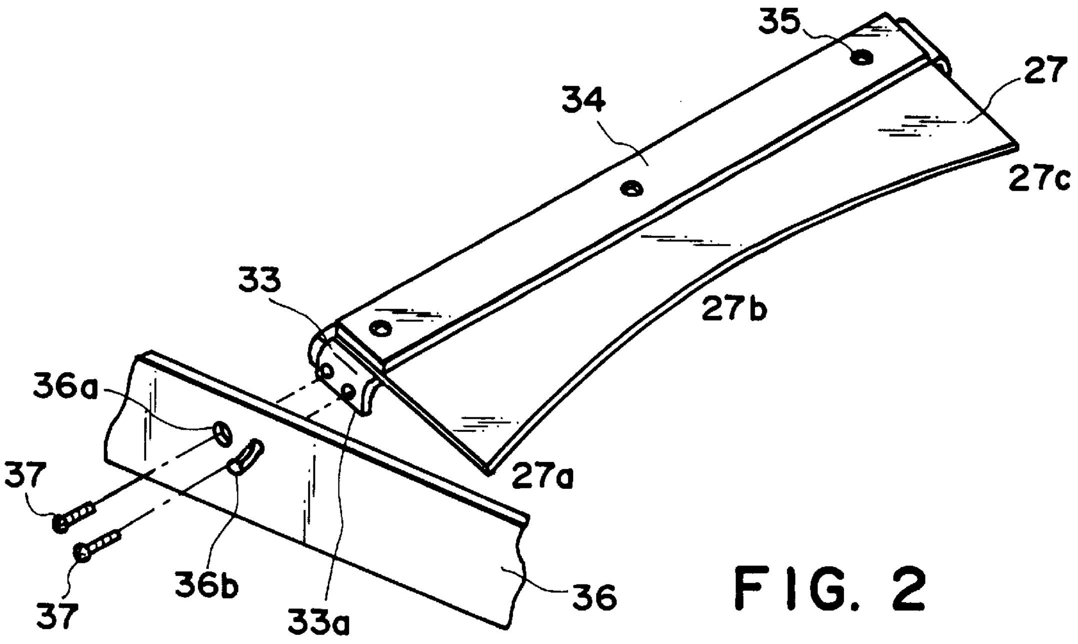
FIG. 2 is a schematic perspective view of sheet pressing means used in the heat development device shown in FIG. 1.

FIG. 2 illustrates more specifically an embodiment of the heat pressing means 27 used in the heat development device of the present invention.

Referring to FIG. 2, the heat pressing means 27 is supported between supporting member 33 and 34 and fixed by screws 35. At an end portion 33*a* of the supporting member 33, the supporting member 33 is fixed on a frame member 36 by two screws 37 and two internal threads provided to the portion 33*a* through screw holes 36*a* and 36*b* wherein the screw hole 36*a* is in the form of a circle and the screw hole 36*b* is in the form of a partial arc allowing the frame member 36 to be rotatable on the screw hole 36*a*. Accordingly, in the present invention, it is possible to adjust an angle formed between the sheet pressing means 27 and the heat guide plate 25, as desired. The sheet pressing means 27 has a lower end in the form of a partial arc wherein a central portion 27*b* thereof has a shorter length (in the direction perpendicular to the width direction and parallel to the sheet conveyance direction) than both end portions 27*a* and 27*c* thereof. Generally, a roller and a heat guide plate are liable to have a higher temperature at a central portion because of heat diffusion from both end portions. For this reason, a resultant imaging sheet is liable to have a lower temperature leading to a lower image density at both end portions in its width direction than at a central portion. Accordingly, it is possible to solve such a problem by appropriately controlling a pressing force of the sheet pressing means and/or a contact area of the sheet pressing means with an imaging sheet in a width direction perpendicular to a sheet conveyance direction. In this embodiment (of FIG. 1), the sheet pressing means 27 has longer end portions 27*a* and 27*c* in the sheet conveyance direction to form a larger contact (or pressing) area leading to a longer contact time against the imaging sheet 32 than at the central portion 27*b*, thus resulting in a uniform image density with respect to the entire imaging sheet. This result is also obtained by applying different sheet pressing forces to the imaging sheet at the central portion and both end portions, i.e., applying a larger pressing force to the imaging sheet at both end portions than at the central portion.

Figure 3:
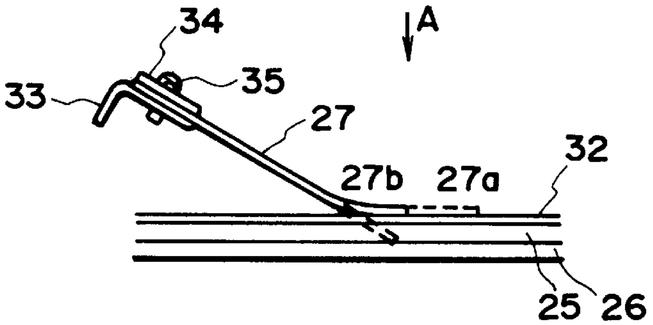
FIG. 3 is a schematic sectional view of the sheet pressing means of FIG. 2.

FIG. 3 illustrates an embodiment of a pressing state of the sheet pressing means 27 against the imaging sheet 32 shown in FIG. 2. As shown in FIG. 3, the sheet pressing means 27 is arranged to be pressed against the imaging sheet 32 at not only the end sections 27*a* (and 27*c* (not shown)) but also the central portion 27*b*. When the contact region between the sheet pressing means 27 and the imaging sheet 32 is viewed from the direction of the arrow A, the contact region has a form as shown in FIG. 4.

Figure 4:
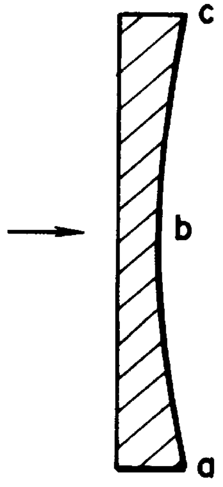
FIG. 4 is a view for illustrating a contact region between the sheet pressing means of FIG. 2 and an imaging sheet.

Referring to FIG. 4, the arrow represents the sheet conveyance direction and the contact region is narrower at a central portion b than at both end portions a and c.

The sheet pressing means 27 as shown in FIGS. 2–4 may preferably e formed of an elastic member advantageous to a simple and inexpensive pressure-adjustable structure as well as uniform heat development.

Incidentally, in this embodiment of FIG. 1, the imaging sheet 32, the heat guide plate 25 and the heater 26 may generally have widths of 355 mm, 370 mm and 430 mm, respectively.

Figure 5:
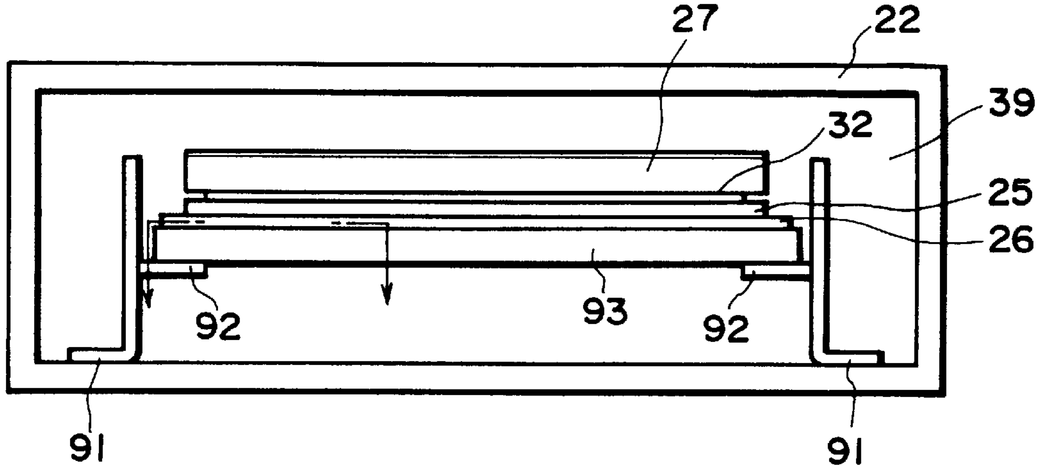
FIG. 5 is a schematic sectional view of the heat development device of FIG. 1 taken in the arrows in FIG. 1 (viewed from the sheet conveyance direction).

FIG. 5 is a schematic sectional view of the heat development device of FIG. 1 viewed from the direction of the upper and lower arrows (in FIG. 1), i.e., viewed from the sheet conveyance direction on the outlet side. Referring to FIG. 5, a frame member (supporting member) 91 (e.g., formed of iron) is fixed on the heat insulating member 22 in the form of a box and provided with a projection portion (holding portion) 92 (e.g., formed of iron) on which a poor heat conductive (or heat insulating) and rigid member 93 (e.g., epoxy resin) is supported or held. On the rigid member 93, the heater 26 (heating means) and the heat guide plate 25 (sheet guide means) are successively disposed and fixed. In this instance, the heater 26 and the heat guide plate 25 may preferably be formed in lamination structure.

Figure 6:
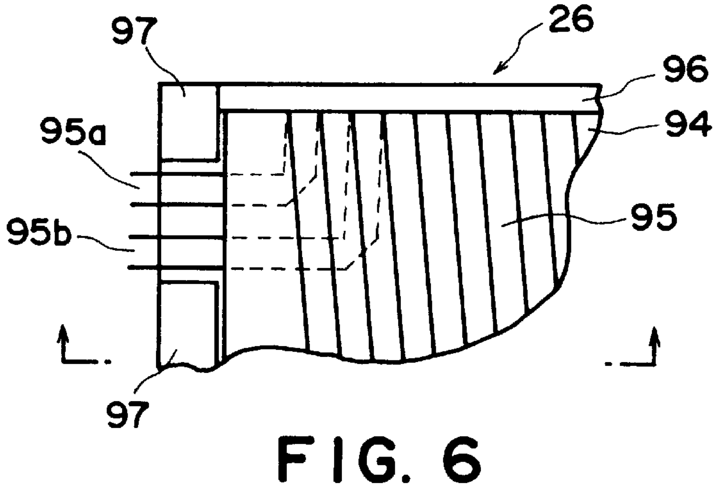
FIG. 6 is a partially enlarged view of the heater in FIG. 5 taken in the arrows in FIG. 5.

FIG. 6 shows a structure of the heater 26 shown in FIG. 5 viewed from the direction of the arrows in FIG. 5. Referring to FIG. 6, the heater 26 includes a core material 94, an electric-resistance member (or a resistance wire) 95 in the form of a thin plate, a high heat-resistant sealing material 96, and a spacer 97. The electric-resistance member 95 is uniformly wound about the core material 94 which is heat-resistant material and electrical insulating material, such as mica in such a manner that the resistance member (resistance wire) 95 is first wound about the core material 94 from one end (first end) thereof as far as the other end (second end) thereof and returns to the one end (first end) while keeping a non-contact state therebetween and a substantially uniform pitch (or distance) therebetween. The first and second ends of the resistance member 95 are connected with an electrical circuit (not shown) via portions 95*a* and 95*b*. The sealing material 96 is made of, e.g., silicone rubber and covers the resistance member 95. On the sealing material 96, the heat guide plate 25 is laminated or disposed closely. In this case, however, it is preferred to fill a gap between the sealing material 96 and the heat guide plate 25 with, e.g., silicone grease in order to ensure good and uniform heat conduction free from locally irregular heat conduction. Incidentally, the rigid member 93 is not necessarily be disposed under the entire heat guide plate 25 both in the width and sheet conveyance directions. The rigid member 93 may be disposed under a part of the heat guide plate 25 while maintaining the flatness of the heat guide plate 25 and the heater 26 by the rigidity of the heat guide plate 25. In this instance, the remaining part of the heat guide plate 25 under which the rigid member 93 is not disposed makes contact with ambient air but ambient air has good heat insulating properties, thus functioning as a certain heat insulating material.

Figure 8:
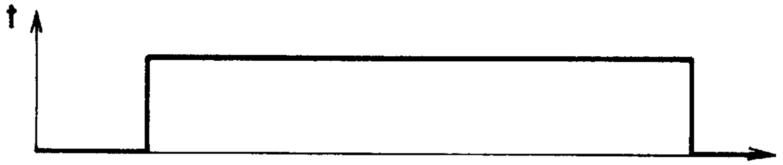
FIG. 8 is a graph showing a temperature distribution of the sheet guide plate in FIG. 5.

In this embodiment, the resistance wire (resistance member) 95 generates heat by carrying electricity thereto and heats the heat guide plate 25. As described above, the resistance wire 95 is uniformly wound about the core material 94 and accordingly is uniformly heated, thus resulting in uniform heat conduction to the sealing material 96. Heat conductive or transmitted to the sealing material 96 partially escapes to the frame member 91 through the heat insulating (rigid) member 93 but the amount of the heat at this time is very small due to the heat insulating properties of the heat insulating member 93. A considerable amount of heat is consumed for heating the heat guide plate 25. From the heat guide plate 25, a small amount of heat escapes to air but heat conduction through air is little. In addition, the contact state of the heat guide plate 25 with air is uniform in its width direction and accordingly heat connection from the heat guide plate 25 to air is effected uniformly, if any. Further, although heat dispersion (dissipation) from the elastic member sheet pressing means 27 (as shown in FIG. 2) can occur but the amount thereof per unit time is small due to its small thickness. Moreover, the elastic member keeps a uniform contact state in its width direction, so that heat conduction at this time is performed uniformly Accordingly, it is possible to provide such a state that heat guide plate is supplied with a large amount of heat and a small amount of heat is dispersed or diffused therefrom. In such a state, as the heat guide plate per se is a good heat conductive member, non-uniformity of thermal distribution within the heat guide plate is quickly obviated by heat diffusion within the heat guide plate. As a result, the heat guide plate shows a uniform temperature distribution over the entire widthwise direction as shown in FIG. 8 wherein a temperature (t) of the heat guide plate is plotted along the ordinate and the abscissa represents respective positions corresponding to those of the heat guide plate 25 shown in FIG. 5.

Figure 7:
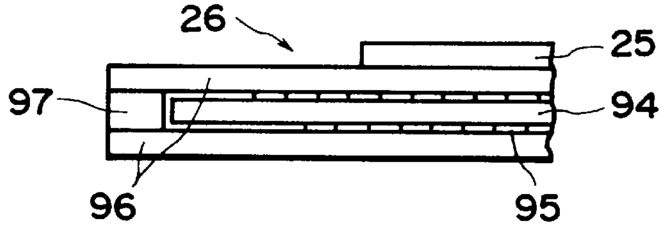
FIG. 7 is another partially enlarged view of the heater in FIG. 5 taken in the arrows in FIG. 6.

After the heat guide plate reaches a prescribed temperature, the amount of heat by heat conduction from the heater is controlled to be substantially equal to that of heat diffused or dispersed from the heat guide plate by heating the resistance wire intermittently or continuously changing a current passing through the resistance wire to adjust the amount of heat generation, by means of a control means (not shown). In this case, it is also possible to keep the uniformity of thermal distribution in a widthwise direction with respect to the heat guide plate since the heat diffusion from the heat guide plate is uniformly effected in the width direction thereof. Strictly speaking, the heat guide plate is liable to have a lower temperature at (right and left) end portions due to possible heat diffusion from a part of the lower side of the heat insulating member 93 (toward the projection portion 92), and both end portions of various members, such as the heat insulating member, the heater, the heat guide plate, the imaging sheet and the sheet pressing member 27. However, in the present invention, the entire portion of the resistance wire of the heater has a width broader than a width of the heat guide plate as shown in FIG. 7 taken in the arrows in FIG. 6, whereby the amount of heat due to heat conduction to the end portion of the heat guide plate is somewhat increased to compensate a loss of the amount of heat therefrom. As a result, it is possible to provide the heat guide plate with a uniform thermal (heat) distribution as shown in FIG. 8 because the heat guide plate has a good heat-conductive ability to quickly uniformize heat distribution in the heat guide plate as a whole. This effect can also be attained by changing a contact state in a width direction between the sheet pressing member 27 and the imaging sheet as shown in FIGS. 2 –4.

Figure 9:
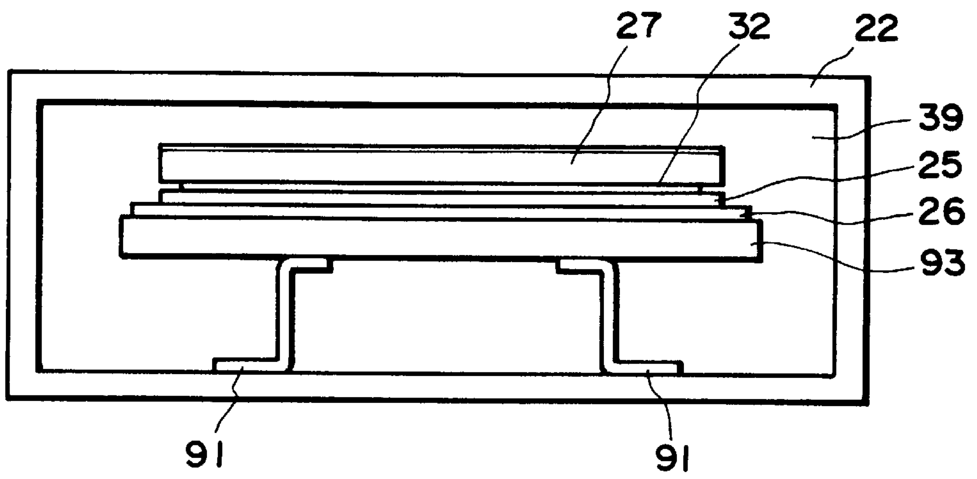
FIG. 9 is a schematic sectional view of an embodiment of the heat development device of the present invention.

Referring again to FIG. 5 the heat insulating member 93 is supported by the frame member 91 via the projection portion 92 provided to the frame member 91 at both end portions of the heat insulating member 93, so that there is a possibility that a small amount of heat is diffused or dispersed from the frame member 91 or the end portions of the heat insulating member 93 to decrease the temperature of the heat insulating member 93 at both the end portions. If the heat guide plate 25 cannot be maintained to have a prescribed temperature as a whole for the above reason, the heat insulating member 93 may be supported by the frame member 91 at inner portions (other than the end portions) as shown in FIG. 9. In this instance, the above-described local temperature decrease at the end portions of the heat insulating member 93 can effectively be suppressed.

Figure 10:
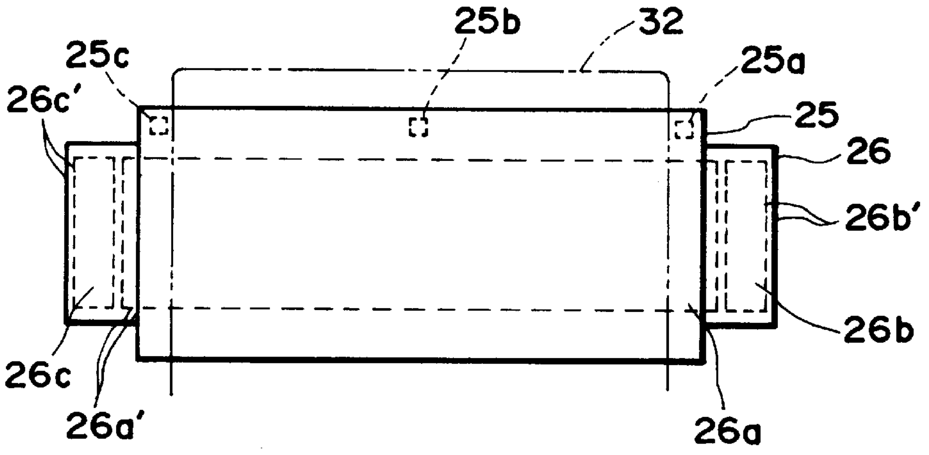
FIG. 10 is a partially plan view of the sheet guide means and heating means shown in FIG. 1.

FIG. 10 is a plan view of an embodiment of the heat guide plate 26 and heater 25 used in the heat development device 21 of FIG. 1.

Referring to FIG. 10, the sheet pressing means 27 is omitted. A planar heater 26 (heating means) has a similar structure as in the heater 26 shown in FIG. 6 but is divided into three portions 26*a*, 26*b* and 26*c*. These three portions 26*a*, 26*b* and 26*c* can be heated independently by applying the current to the respective portions 26*a*, 26*b* and 26*c* through respective ends 26*a*', 26*b*' and 26*c*' of the respective divided portions (comprising resistance wires) of the heater 26. The heat guide plate 25 is provided with three temperature sensors 25*a*, 25*b* and 25*c* at a central portion (25*b*) and both end portions (25*a* and 25*c*) in its width direction. In this embodiment, based on temperatures detected by the temperature sensors 25*a*, 25*b* and 25*c*, the above three portions 26*a*, 26*b* and 26*c* of the heater 26 are controlled by three a control means (not shown), respectively. As a result, even if heat diffusion from both end portions of the heat guide plate 25 occurs, an amount of heat necessary to compensate such a heat diffusion can be supplied from the portions 26*b* and 26*c* of the heater 26, respectively. In this embodiment, three control means as described above are required to be used but can maintain a uniform temperature of the heat guide plate with precision. However, it is possible to control the portions 26*b*. and 26 at the same time by a single control means as far as the heat guide means can retain a uniform temperature as a whole although the precision of temperature control is schematic view of an embodiment of the heat development device of the present invention.

In this embodiment, the heat development device includes a heating means is divided into at least three portions including both end portions and a central portion and has a width as a whole more than a width of the sheet, wherein both end portions are located outwardly from a corresponding end of the sheet in a width direction and being controllable independent of a residual portion of said at least three portions.

Figure 11:
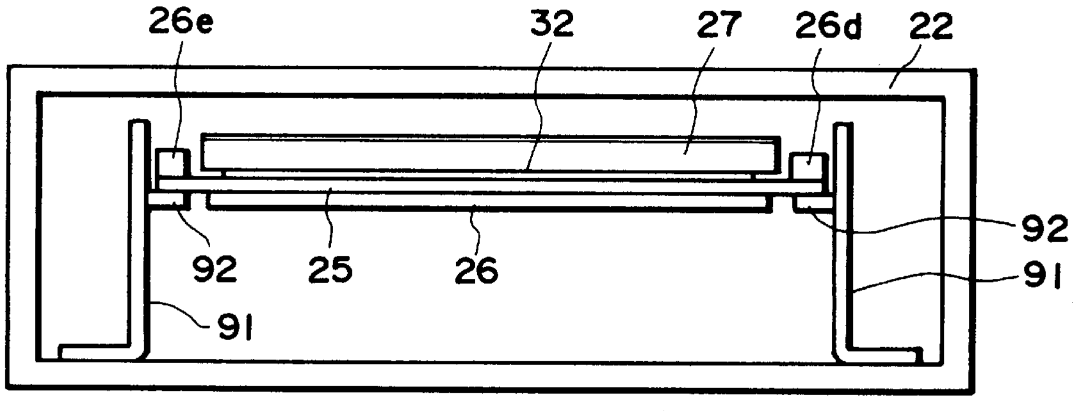
FIG. 11 is a schematic sectional view of an embodiment of the heat development device of the present invention.

By using the above heat development apparatus, it is possible to make uniform a temperature distribution of the contact portion between the sheet guide means and the sheet. FIG. 11 shows an embodiment of such a heat development device.

More specifically, the heat guide plate (sheet guide means) 25 has a larger with than a width of a heater (heating means) 26 disposed at a central portion to some extent but is provided with other heaters (heating means) 26*d* and 26*e* at end portions (outwardly elongated portions) thereof. The heaters 26*d* and 26*e* may be controllable independent of the heater 26. The heat guide plate 25 is directly supported by the frame member 91 having the projection portion 92. Accordingly, a large amount of heat is diffused from both end portions of the heat guide plate 25. However, such an amount of heat diffusion from both the end portions of the heat guide means 25 is counterbalanced with the amount of heat conduction from the heaters 26*d* and 26*e* by appropriately control the heaters 26*d* and 26*e*, so that the temperature distribution of the contact portion of the heat guide plate 25 with the imaging sheet 32 can effectively be uniformized. In this embodiment, a planar heater is used as the heater, whereby a certain length of the imaging sheet 32 in the sheet conveyance direction can stably be controlled to have a prescribed temperature for a prescribed time with precision through the heat guide plate 25 having a uniform temperature distribution.

Figure 12:
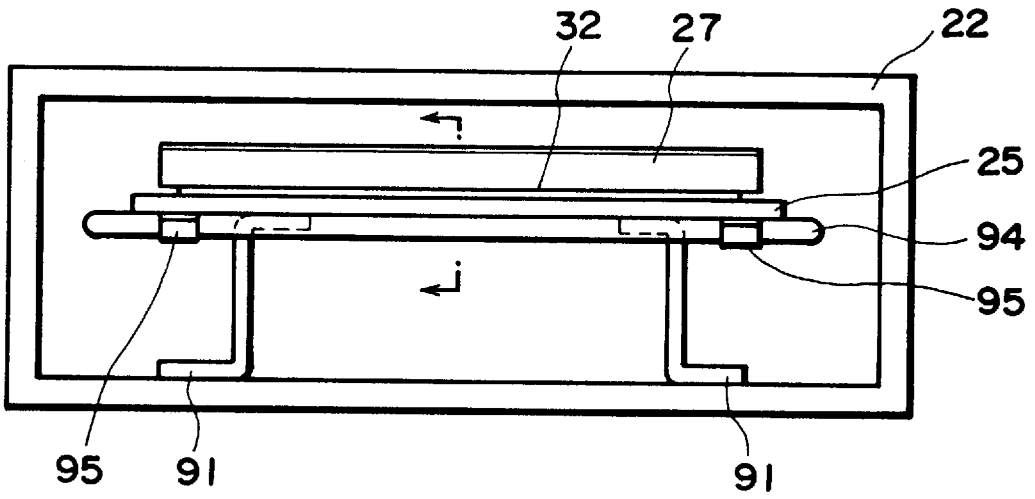
FIG. 12 is a schematic sectional view of an embodiment of the heat development device of the present invention.
Figure 13:
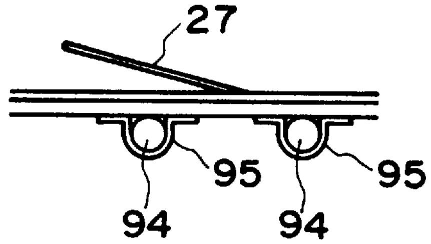
FIG. 13 is a schematic sectional view of the heat development device of FIG. 12 taken in the arrows in FIG. 12.

If such a precise temperature control is not required, it is possible to employ as the heater 26 a (round) bar heater 94 as shown in FIG. 12 and FIG. 13 which is taken in the arrows in FIG. 12. Referring to these Figures, the heat guide plate 25 is supported by the frame member 91 and the bar heater 94 is secured tightly by a fixing (holding) member 95.

In the present invention, the heater guide plate (sheet guide means) 25 may comprises a good heat conductive material, such as a metal plate of iron, stainless steel, or copper in addition to aluminum as described above. The heater (heating means) 26 is not restricted to the planar heater employing, e.g., the resistance wire or the bar heater but may be one, e.g., using a halogen lamp. Alternatively, it is possible to use a means for applying a microwave to a non-conductive material or a microwave heating element as the heater 26 (or 94). The heat insulating members (e.g., 22, 91, 92 and 93) may comprise a heat insulating resin, such as epoxy resin or silicone rubber, having a sufficiently low coefficient of heat conduction (thermal conductance) compared with the heat guide plate 25.

Then, an operation of the heat development device of the present invention will be explained with reference to FIG. 1.

Referring to FIG. 1, the imaging sheet 32 having been subjected to imagewise exposure enters the heat development device 21 from the inlet 22*a* (as shown by he left-side arrow) and is first nipped or disposed between the pair of first heating rollers 23 from the forward end thereof. The imaging sheet 32 is conveyed by the rotation of the first heating rollers 23 toward the right direction on the drawing while being supplied with heat from the first heating rollers 23. The forward end of the imaging sheet 32 reaches the pair of second heating rollers 24 where the forward end of the imaging sheet 32 is further conveyed.in the right direction while being heated by the second heating rollers 24 similarly as in the case of the first heating rollers 23. Then, the forward end of the imaging sheet 32 reaches the heat guide plate 25, where the imaging sheet 32 is conveyed thereon while being successively pressed against the heat guide plate 25 by the plural sheet pressing means 27 under an appropriate pressure, thus being ejected from the heating chamber 39. As described above, the heat development is performed during the conveyance operation of the imaging sheet 32 within the heating chamber 39. The reaction of heat development is initiated at or above a certain temperature and promoted by retaining such a temperature. For instance, in the case of an ordinary dry-type silver salt film, the heat development reaction starts at about 80° C. and is accelerated by keeping the film at about 120° C. The first and second heating rollers 23 and 24 function as means for quickly and uniformly heating the film (as the imaging sheet) to a temperature nearer to the reaction initiation temperature. In the present invention, various conditions including the rotation speeds of the first and second heating rollers 23 and 24, the length of the heat guide plate 25, and the set temperatures of the respective heaters 38 may suitably be set depending on properties of the imaging sheet 32 to be developed.

The ejected imaging sheet 32 from the heating chamber 39 is then nipped between the pair of cooling rollers 30 disposed inside of the cooling chamber 40 and is cooled to room temperature while being conveyed in the right direction. During this step, the temperature of the imaging sheet 32 can be lowered down to a temperature not promoting the development reaction to terminate the development reaction. The (completely) cooled imaging sheet 32 is ejected or taken out from the outlet 31*a* toward the outside of the heat development device 21 (as shown by the right-side arrow).

As described hereinabove, according to the heat development device, e.g., of FIG. 1 according to the present invention, the imaging sheet 32 before reaching the heat guide plate 25 is heated in advance by using the first and second heating rollers 23 an 24, whereby it is possible to minimize a temperature-rising range on the heat guide plate 25 and also to lessen an irregularity in the degree of heating.

Further, by providing th e cooling chamber 40, the development reaction of the imaging sheet can be terminated. As a result, the influence of different room temp eratures at the outside the heat development device 21 on an image density of the developed image due to different cooling state s of the ima ging sheet 32 resulting from a fluctuation in room temperature can be avoided or obviated. In addition, the imaging sheet 32 has already been cooled within the heat development device 21, is that an operator's safety is ensured and the imaging sheet 32 can be ejected immediately after the heat development to shorten the operation time. Further, the pair o f cooling roller 30 can be used as a cooling means, so that the cooling roller 30 can also be used as an ejection roller or can convey the imaging sheet to an ejection roller.

In the present invention, the heat development device 21 includes the heat insulating member 22 surrounding the heating chamber 39, whereby a loss of heat (heat dissipation) is minimized and accordingly an electric power consumption is decreased. Further, when the heat development device is incorporated in the image recording apparatus of the present invention (described hereinafter), the influence of heat conduction from the heat development device on other members of the image recording apparatus can be minimized advantageously. In addition, as a temperature control of ambient air within the heating chamber is effected, it is possible to decrease a change in developing conditions.

Then, some preferred embodiments of the sheet pressing member used in the heat development device of the present invention will be described with reference to FIGS. 14–18.

Figure 14:
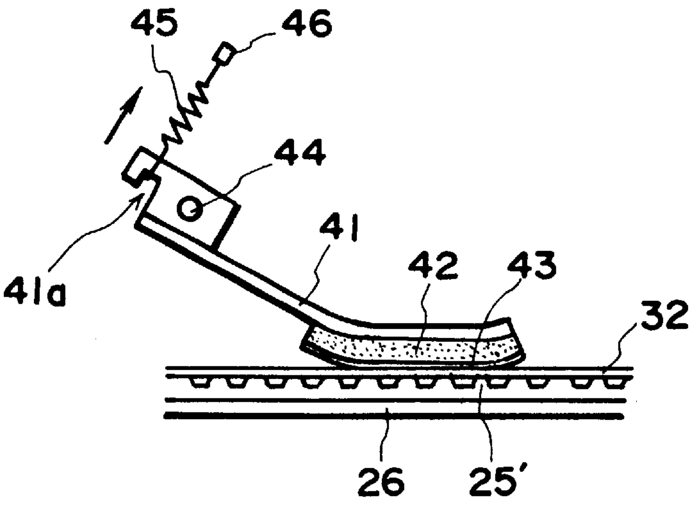
FIGS. 14–18 are schematic sectional views each illustrating an embodiment of a sheet pressing means used in the heat development device of the present invention.

FIG. 14 is a schematic sectional view showing a first embodiment of the sheet pressing member. Referring to FIG. 14, the sheet pressing member include a pressing plate 41, an elastic layer (a layer rich in elasticity) 42, a surface layer 43, a rotating shaft (axis) 44, a tension spring 45, a hook portion 41a, and a spring-holding member 46. To the pressing plate 41, a member comprising the surface layer 43 having a smooth surface and a reduced frictional force at the contact portion with the imaging sheet 32 and comprising the elastic layer 42 is bonded. The pressing plate 41 is rotatably supported on the rotating shaft 44. The tension spring 45 is hooked or locked at the hook portion 41a of the pressing plate 41 disposed away from the contact portion with the imaging sheet 32 and is supported by the spring-holding member 46 at the other end. As a result, the pressing member 41 is forced in the direction of the arrow (in clockwise direction) by the tension spring 45. The pressing plate 41 can be adjusted to exert a desired pressing force on the imaging sheet 32 by changing its position variably.

According to this embodiment as shown in FIG. 14, there is provided an inexpensive and simple sheet pressing means capable of effectively pressing the imaging sheet 32 against the heat guide plate 25. Further, it is possible to more effectively obviate non-uniformity of heat conduction by appropriately changing the width of the surface layer 43 in contact with the imaging sheet 32 and/or the rigidity (or elasticity) of the elastic layer 42 in the width direction (perpendicular to the sheet conveyance direction). This embodiment may be modified by utilizing the weight of the sheet pressing means per se as a pressure application means instead of the tension spring 45 and by directly pressing the imaging sheet 32 against the heat guide plate 25 without using the layers 42 and 43. Incidentally, in this embodiment, a heat guide plate 25' provided with an unevenness (recesses and projections) of, e.g., an embossed pattern at the upper surface facing the imaging sheet 32 (a surface being in contact with the imaging sheet 32) is used as the heat guide plate 25 used in the embodiment of FIG. 1. By providing the heat guide plate with an embossed unevenness pattern, the contact area between the heat guide plate 25' and the imaging sheet 32 is decreased to somewhat lower the heat conduction efficiency. In this case, however, the heat guide plate 25' makes uniform contact with the entire imaging sheet 32 at its projections to heat the imaging sheet 32 uniformly while preventing the attachment of the imaging sheet 32 to the heat guide plate 25' leading to conveyance failure. In this embodiment, the sheet pressing means utilizes a restoring force of the tension spring 45 based on spring action, thus facilitating the setting and adjustment of the pressing force.

Figure 15:
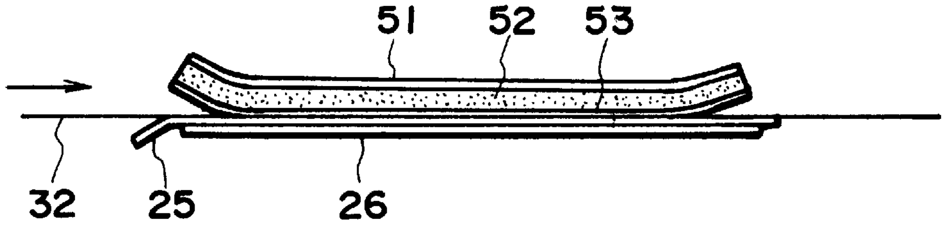

FIG. 15 is a schematic sectional view of a second embodiment of the sheet pressing means. Referring to FIG. 15, the sheet pressing means includes a sheet pressing plate 51, an elastic member 52 and a smooth-faced member 53. The sheet pressing plate 51 is supported and fixed by supporting member (not shown). The elastic member 52 may comprise a foamed material and the smooth-faced member 53 allows a smooth contact state with the imaging sheet 32 conveyed from the direction of the arrow. These members 52 and 53 are bonded to the pressing plate 51 in lamination. When the imaging sheet 32 passes, the imaging sheet 32 is effectively pressed against the heat guide plate 25 by the elastic fore of the elastic member 53. In this embodiment, by appropriately changing the spacing between the pressing plate 51 and heat guide plate 25 and/or the thickness and rigidity (or elasticity) in the width direction, it is possible to realize uniform heat conduction to the imaging sheet 32. The sheet pressing member of this embodiment utilizes the elastic force of the elastic member 52 as a pressing force, so that the number of movable portions are lessened to allow a simple structure.

Figure 16:
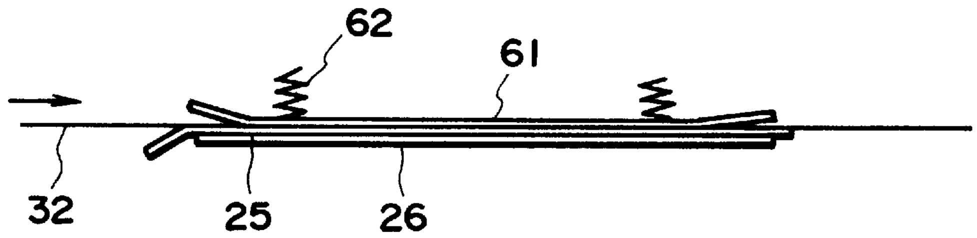

FIG. 16 is a schematic sectional view of a third embodiment of the sheet pressing means. Referring to FIG. 6. A pressing plate 61 presses the imaging sheet 32 conveyed from the direction of the arrow against the heat guide plate 25 by the action of a compression spring 62 at a desired pressure. The pressing plate 61 has a smooth surface which comes in contact with the imaging sheet 32. By controlling the degree of compression, it is possible to readily provide a suitable pressing force.

Figure 17:
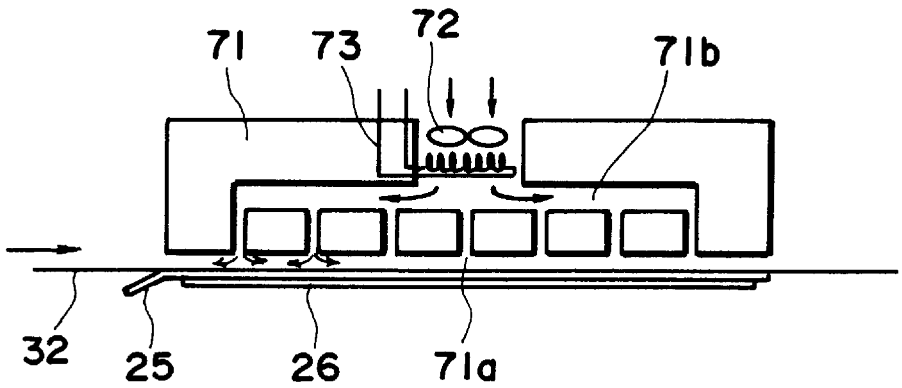

FIG. 17 is a schematic sectional view of a fourth embodiment of the sheet pressing means. In this embodiment, the imaging sheet 32 is pressed against the heat guide plate 5 by blowing air against the imaging sheet 32. In FIG. 17, a nozzle portion (airstream nozzle) 71 includes a fan 72 and a heater 73 and is provided with a large number of small holes (air passageways) 71*a* at the surface facing the imaging sheet 32. Air heated by the heater 73 is caused to blow through a passage 71*b* and the small holes 71*a* by the rotation of the fan 72 under heating with the heater 73 toward the imaging sheet 32, whereby the imaging sheet 32 is uniformly supplied with a prescribed pressure and heat at the same time. Further, non-uniformity of heating can be obviated by appropriately changing the density (number) of the small holes 71*a* in the width direction. According to this embodiment, the sheet pressing means comprises airstream or airflow with heated air, so that the imaging sheet 32 can substantially obviate scars due to the friction between the sheet and the sheet pressing member while being heated uniformly.

Figure 18:
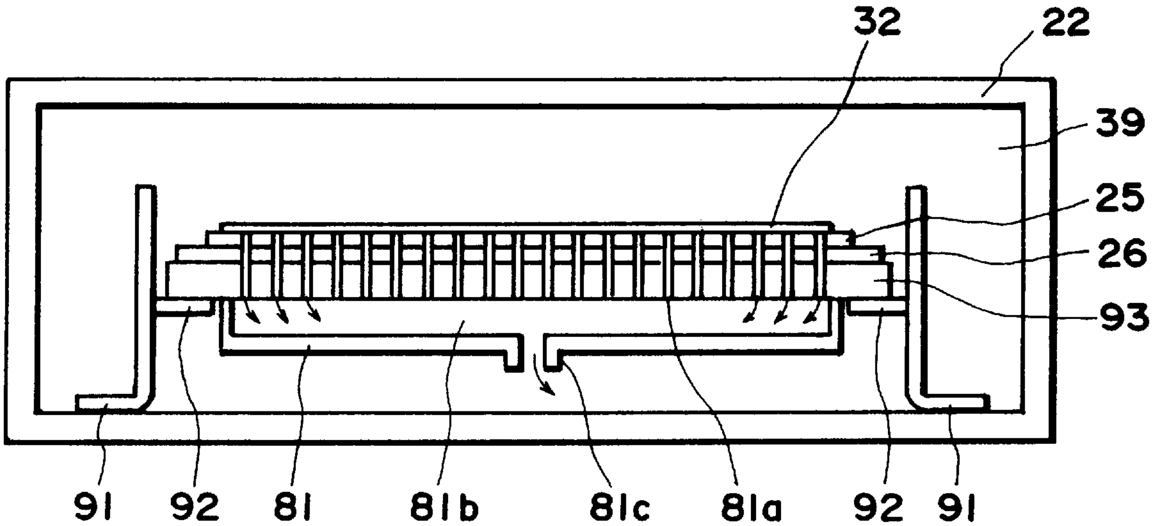

FIG. 18 is a schematic view of the heat development device of the present invention for illustrating a fifth embodiment of the sheet pressing means. In this embodiment, the heat guide plate 25, the heater 26 and the heat insulating member 93 is provided with a large number of small through openings 81*a* from which air is evaluated or sucked, whereby the imaging sheet 32 is adsorbed by or attached to the heat guide plate 25 to provide a contact state under reduced pressure. The small through openings 81*a* communicate with a passage 81*b* defined by the heat insulating member 93, a duct (surrounding) member 81, and a suction port 81*c* from which air within the openings 81*a* and the passage 81*b* is sucked by using a (suction) pump (not shown). As described above, in this embodiment, the sheet pressing means utilizes negative or reduced pressure and accordingly herein includes members constituting a mechanism of internal air evacuation, i.e., includes the case that the imaging sheet 32 per se is pressed against the heat guide plate 25 as a result of the action of negative (reduced) pressure. Further, by appropriately charging the density (number) of the small through openings 81*a* in the width direction (perpendicular to the sheet conveyance direction), non-uniformity of heating state can easily be obviated. In addition, similarly as in the fourth embodiment, the imaging sheet 32 is not readily scarred by the sheet pressing means since the sheet pressing means employs negative pressure or an evacuation mechanism.

As partially described hereinabove, the heat development device according to the present invention may preferably have at least one of the following structural features (i) to (v):

(i) the heating means and the sheet guide means are supported by a frame member through a heat-insulating member, (ii) the heating means is in the form of a plate and laminated on the sheet guide means and has a substantially constant width with respect to a sheet conveying direction, (iii) the heating means is divided into at least two portions, particularly three or more portions, in a width direction thereof and such at least two portions are independently controllable, (iv) the sheet pressing means comprises an elastic member and is disposed in contact with the sheet at a first portion thereof and is away from the sheet at a second portion thereof, wherein the first portion is located forward in a sheet conveyance direction compared with the second portion, and (v) a preliminary heating section and a heating section comprising sheet guiding means in the form of a plate and comprising heating means for heating the sheet guiding means are disposed, and the preliminary heating section and the heating section are defined by a heat-shielding member.

Then, the heat development device according to the present invention having the above structural features (v) will be explained below.

Figure 19:
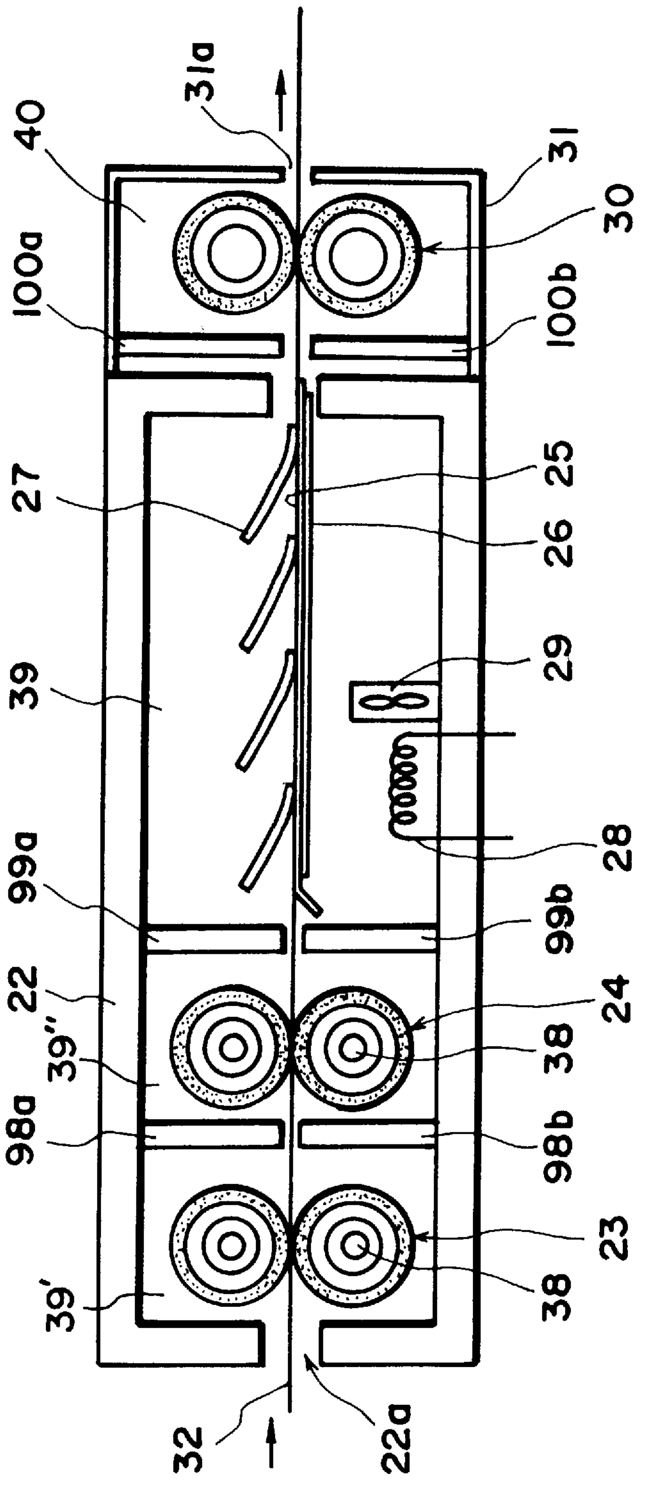
FIG. 19 is a schematic sectional view of an embodiment of the heat development device of the present invention.

FIG. 19 is a schematic sectional view of an embodiment of such a heat development device. Referring to FIG. 19, the heat development device includes three pairs of heat-shielding members 98*a* and 98*b*, 99*a* and 99*b*, and 100*a* and 100*b*, respectively, to define a preliminary heating section (or chamber) 39', a preliminary heating section 39", a heating section 39, and a cooling section 40. By providing these shielding members (98*a*, 98*b*, 99*a*, 99*b*, 100*a* and 100*b*) to the heat development device, it is possible to prevent heat (thermal) connection among the above sections 39, 39', 39" and 40 and to suppress irregularity in heat conduction to the imaging sheet 32.

In FIG. 19, the preliminary heating sections 38' and 39" include a pair of conveyance heating rollers 23 and a pair of conveyance heating rollers 24, respectively.

The cooling section 40 includes a pair of conveyance cooling rollers 30.

The cooling section 40 is adjacent to the heating section 39 and disposed opposite to the preliminary heating sections 39' and 39" with respect to the heating section. The cooling section 40 and the heating section 39 are defined by the heat-shielding members 100*a* and 100*b*.

In the heat development device of the present invention, the heating rollers (23, 24) and cooling rollers 30 can be omitted. In this case, ordinary conveyance rollers for conveying the imaging sheet may be disposed in front of and back of the heat development device (in the sheet conveyance direction), respectively.

Hereinbelow, the image recording apparatus according to the present invention will be described.

Figure 20:
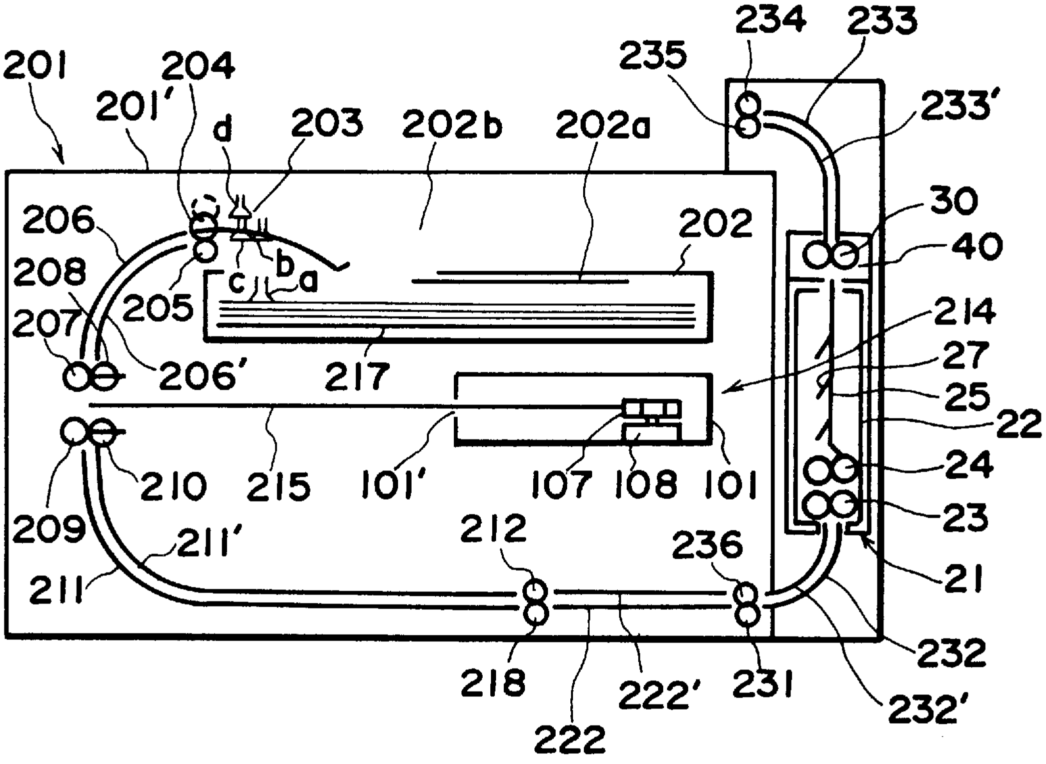
FIG. 20 is a schematic sectional view of an embodiment of the image recording apparatus of the present invention.

FIG. 20 is a schematic sectional view of an embodiment of the image recording apparatus incorporating the heat development device therein according to the present invention.

Referring to FIG. 20, the image recording apparatus includes a recording apparatus body 201 and a heat development device 21. The recording apparatus body 201 is used for recording a digital image obtained by using a medical image-generation unit utilizing CT or MRI onto an imaging sheet by means of a scanning optical system 214. The recording apparatus body 201 includes a housing 201' for providing the apparatus body with a light-interrupting state. Inside the housing 201', a sheet-supply magazine (container) 202 containing therein a pile of unused sheets and provided with a top or cover 202*a* which is freely movably so as to opened and shut is disposed. When the top 202*a* is shut, the inside of the supply magazine 202 is placed in a light-interrupting state. Accordingly, the supply magazine 202 can be incorporated in or removed from the apparatus body 201 without exposing the inner sheets to light.

Figure 21:
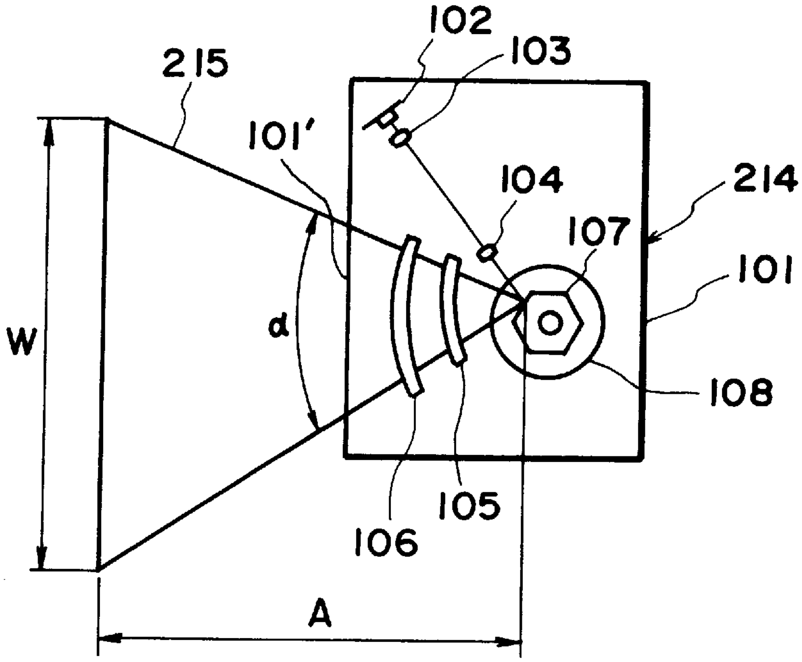
FIG. 21 is a partially sectional plan view of the optical scanning unit shown in FIG. 20.
Figure 22:
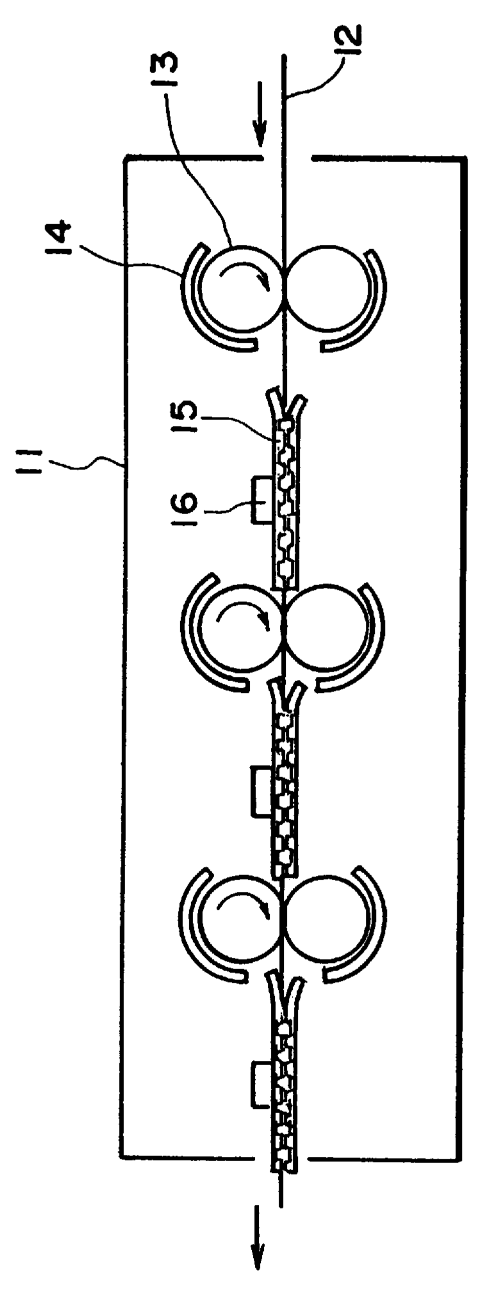
FIG. 22 PRIOR ART
FIG. 22 is a schematic sectional view of an embodiment of a conventional heat development device.
Figure 23:
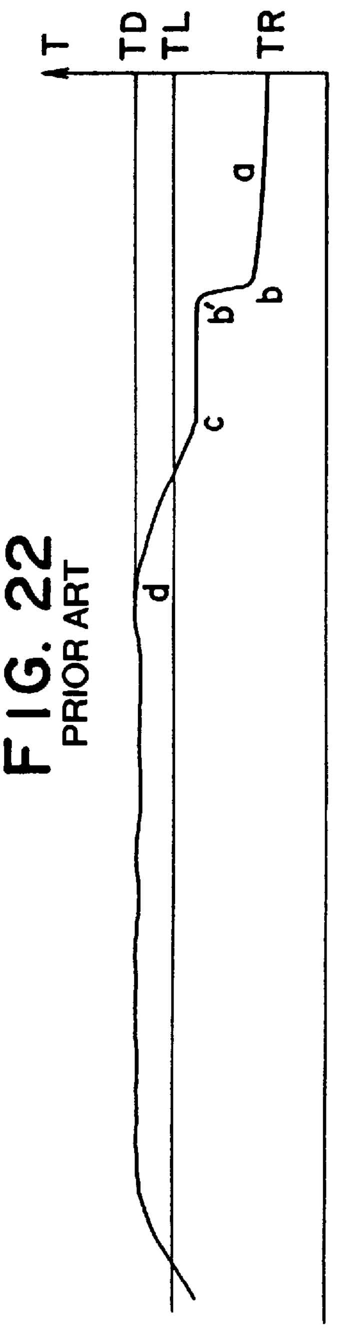
FIG. 23 PRIOR ART
FIG. 23 is a graph showing a temperature change of a film passing through the heat development device of FIG. 22.
Figure 24:
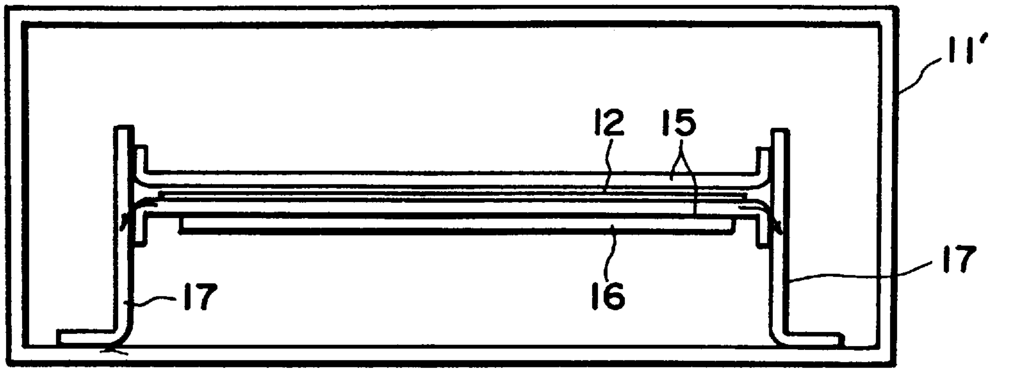
FIG. 24 PRIOR ART
FIG. 24 is a schematic sectional view of an embodiment of a conventional heat development deview viewed from the sheet conveyance direction.
Figure 25:
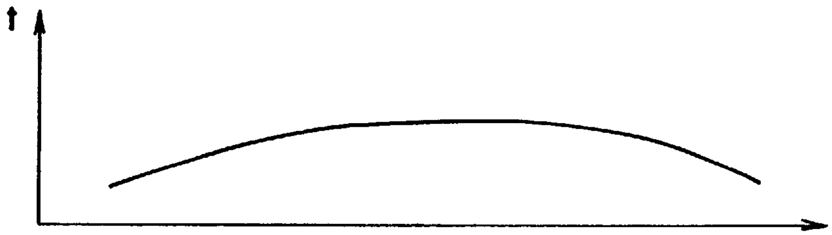
FIG. 25 PRIOR ART
FIG. 25 is a graph showing a temperature distribution of the guide plate shown in FIG. 24.

The scanning optical system 214 is specifically shown in FIG. 21 which is a partially enlarged plan view of that of FIG. 20.

Referring to FIG. 21, the scanning optical system 214 includes a housing 101 for protecting an optical system and preventing dust from entering. The housing 101 is provided with an opening part 101' disposed so as not obstruct the passing of a laser beam 215. The laser beam 215 is emitted from a laser 102 and is intensity-modulated depending on image data. The laser beam 215 passes through lenses 103, 104, 105 and 106 by which the laser beam is converted so as to have prescribed properties. The laser beam 215 is reflected by a rotatable polygonal mirror 107 which is rotated at a prescribed speed by a motor 108, so that the sheet (217) is scanned with the modulated laser beam 215 which is fanned out to draw a triangular form with the sheet (217) as shown in FIG. 21. Incidentally, if a scanning angle a based on the rotation of the polygonal mirror 107 is too large, the laser beam 215 is changed in form and causes focus deviation by the influence of, e.g., optical aberration of the optical system. For this reason, the scanning angle a may preferably be 30–40 degrees. In this instance, when an imaging sheet (217) having a size of, e.g., 35 cm×43 cm is subjected to main-scanning with an effective scanning width W of, e.g., 33 cm in the direction of the shorter length side (35 cm), the laser beam 215 traverses a distance A (from the polygonal mirror to the imaging sheet) of about 45–50 cm which is substantially equal to or larger than the length of the imaging sheet in its conveyance direction.

Referring again to FIG. 20, a suction unit 203 is supported by a supporting mechanism (not shown) and can be moved from a position (a) to a position (d) through positions (c) and (d) (in alphabetical order). Specifically, the suction unit 203 draws up a piece of top sheet from the pile of unused sheet 217 inside the supply magazine 202 at the position (a) and raises up the (top) sheet (217) to the position (b), followed by horizontal movement to the position (c) in which the sucked sheet (217) is inserted between conveyance rollers 204 and 205. The inserted sheet is moved toward in a downward direction (on the drawing) by the rotation of the rollers 204 and 205 while being guided by guide plates 206 and 206' and then the forward end of the sheet is inserted between sub-scanning rollers 207 and 208. Thereafter, the conveyance roller 204 is moved away from the sheet to the position indicated by a dotted line. The suction unit 203 is also moved up to the position (d) to provide a non-contact state with the sheet.

Then, sub-scanning rollers 207, 208, 209 ad 210 are driven and rotated to convey the sheet downward, whereby sub-scanning of the sheet is performed while main-scanning thereof is performed by irradiating the sheet with the laser beam 215, thus forming a latent image onto the sheet. During the scanning operation, the forward end of the sheet passes between guide plates 211 and 211' to reach between conveyance rollers 212 and 218. After the scanning operation, the sheet is further conveyed in the right direction to pass between guide plates 222 an 222' to reach between conveyance rollers 231 an 236. Then, the sheet is guided upward by guide plates 232 and 232' to enter the heat development device 21 of the present invention.

The operation of the heat development 21 device used in the image recording apparatus 201 is similar to that described hereinabove. Specifically, referring to FIG. 20, the sheet is conveyed upward between first and second conveyance heating rollers 23 and 24 under heating to lead to a heat guide plate 25. Although the sheet is conveyed vertically, the sheet is effectively pressed against by the action of a sheet pressing means 27 to be subjected to heat conduction, thus performing heat development. After the heat development operation, the sheet is cooled between conveyance cooling rollers 30 disposed within a cooling chamber 40 to terminate the development reaction. Thereafter, the sheet is conveyed between guide plate 233 and 233' in the left direction to be discharged through between ejection rollers 234 and 235 to the outside of the image recording apparatus 201. The cooling rollers 30 can be used as ejection rollers if the location thereof is changed.

According to the image recording apparatus in this embodiment incorporates the heat development device of the present invention thereinto, it is possible to allow a good heat development operation. In addition, compared with wet-type image recording apparatus, the image recording apparatus of the present invention allows a small apparatus size and an easy maintenance and also is free from environmental contamination due to waste chemical liquid.

As described hereinabove, various preferred embodiments of the present invention are explained but these embodiments are illustrative and not restrictive. Other various modifications may be made within the scope of the present invention.

For example, the heating rollers (two pairs of rollers used in the above embodiment) may be a pair of heating rollers or three or more pairs of heating rollers. The heater disposed inside the heating roller may be omitted. The cooling chamber (section) may be omitted. The sheet may be conveyed obliquely in addition to horizontal or vertical conveyance. The temperature control with heaters (or heating means) may be controlled in common or independently with respect to respective members (or elements). The set temperatures of the heaters may be the same or different. The temperature control means for controlling the temperature within the heating chamber may be omitted. In case where the pressing force and contact area of the sheet pressing means are changed in the width direction (perpendicular to the sheet conveyance direction) are changed, the pressing force and contact area may be decreased with respect to both end portions of the sheet pressing means depending on a temperature distribution of the imaging sheet. A part or all of an elastic member of the heating and cooling rollers may be omitted and a hollow shaft of the heating and cooling rollers may be disposed in direct contact with the imaging sheet.

What is claimed is:

1. A heat development device for thermally developing a latent image formed on a sheet, comprising: sheet guide means in the form of a plate and heating means for heating said sheet guide means, said heating means having a width more than a width of said sheet guide means and having both ends in a widthwise direction each of which extends outwardly from a corresponding end of said sheet guide means.

2. A device according to claim 1, wherein said heating means has a width more than a width of said sheet guide means by at least 20 mm.

3. A device according to claim 1, wherein said heating means has a width more than a width of said sheet guide means by at least 40 mm.

4. A device according to claim 1, wherein said sheet guide means is provided with an unevenness at the surface facing a sheet.

5. A device according to claim 1, wherein said heating means and said sheet guide means are supported by a frame member through a heat-insulating member.

6. A device according to claim 1, wherein said heating means is in the form of a plate and laminated on said sheet guide means and has a substantially constant width with respect to a sheet conveying direction.

7. A device according to claim 1, wherein said heating means is divided into at least two portions in a widthwise direction thereof and said at least two portions are independently controllable.

8. A device according to claim 1, wherein said heating means is divided into three portions comprising a first end portion, a second end portion and a central portion.

9. A device according to claim 8, wherein said first end portion, said second end portion and said central portion are independently controllable.

10. A device according to claim 8, wherein said first end portion and said second end portion are controllable simultaneously, and said first and second end portions and said central portion are independently controllable.

11. A device according to claim 1, which further comprises sheet pressing means for contact-pressing a sheet against said sheet guide means at the time of conveying the sheet.

12. A heat development device for thermally developing a latent image formed on a sheet, comprising:

sheet guide means in the form of a plate for guiding a sheet being conveyed;

heating means for heating said sheet guide means; and sheet pressing means for contact-pressing the sheet against said sheet guide means at the time of the conveying of the sheet, wherein said sheet pressing means comprises an elastic member and is disposed in contact with the sheet at a first portion thereof and is away from the sheet at a second portion thereon, said first portion being located forward in a sheet conveyance direction compared with said second portion.

13. A device according to claim 12, wherein said sheet pressing means comprises an airstream supplied from on the opposite side of said sheet guide means with respect to the sheet.

14. A device according to claim 12, wherein said sheet pressing means comprises a negative pressure exerted on the sheet through small through openings provided to said sheet guide means and said heating means.

15. A heat development device for thermally developing a latent image formed on a sheet, comprising: a preliminary heating section and a heating section comprising sheet guiding means in the form of a plate and heating means for heating said sheet guiding means, said preliminary heating section and said heating section being separate by a heat-shielding member.

16. A device according to claim 15, wherein said preliminary heating section includes a conveyance heating roller.

17. A device according to claim 15, which further comprises a cooling section adjacent to said heating section and disposed opposite to said preliminary heating section with respect to said heating section, said cooling section and said heating section being defined by a heat-shielding member.

18. A device according to claim 17, wherein said cooling section includes a conveyance cooling roller.

19. A heat development device for thermally developing a latent image formed on a sheet, comprising: sheet guide means in the form of a plate for guiding a sheet; and heating means for heating said sheet guide means, wherein said heating means is divided into at least three portions comprising both end portions and a central portion and has a width as a whole more than a width of the sheet, said both end portions being located outwardly from a corresponding end of the sheet in a widthwise direction and being controllable independent of a residual portion of said at least three portions.

20. A device according to claim 19, wherein said heating means is divided into three portions composed of both end portions and a central portion.

21. An image recording apparatus, comprising:

container means for containing an unused sheet;

recording means for performing recording treatment wherein a latent image is formed on said unused sheet;

and a heat development device for thermally developing a latent image formed on a sheet, wherein said heat development device comprises sheet guide means in the form of a plate and heating means for heating said sheet guide means, and said heating means has a width more than a width of said sheet guide means and having both ends in a widthwise direction each of which extends outwardly from a corresponding end of said sheet guide means.

22. An image recording apparatus, comprising:

container means for containing an unused sheet;

recording means for performing recording treatment wherein a latent image is formed on said unused sheet;

and a heat development device for thermally developing a latent image formed on a sheet, wherein said heat development device comprises sheet guide means in the form of a plate for guiding a sheet, and heating means for heating said sheet guide means, wherein said heating means is divided into at least three portions comprising both end portions and a central portion and has a width as a whole more than a width of the sheet, said both end portions being located outwardly from a corresponding end of the sheet in a widthwise direction and being controllable independent of a residual portion of said at least three portions.

* * * * *

UNITED STATES PATENT AND TRADEMARK OFFICE

CERTIFICATE OF CORRECTION

PATENT NO. : 5,774,204

DATED : June 30, 1998

INVENTORS : KENICHI SUZUKI, ET AL.

It is certified that error appears in the above-identified patent and that said Letters Patent is hereby corrected as shown below:

COLUMN [57] ABSTRACT

Replace Abstract as follows: --A heat development device for thermally developing a latent image formed on a sheet has a sheet guide in the form of a plate and a heater for heating the sheet guide. The heater has a width more than a width of the sheet guide and has both ends in a widthwise direction each of which extends outwardly from a corresponding end of the sheet guide. The heater may preferably be divided into at least three portions which are controllable independently. The heat development device may preferably further include a sheet pressing unit for pressing the sheet against the sheet guide. The heat development device is effective in improving a thermal distribution of the sheet guide to provide an image having a uniform image density formed on the sheet when used in an image recording apparatus.--

COLUMN 1

Line 42, "with" should read --with a--.

UNITED STATES PATENT AND TRADEMARK OFFICE

CERTIFICATE OF CORRECTION

PATENT NO. : 5,774,204

DATED : June 30, 1998

INVENTORS : KENICHI SUZUKI, ET AL.

It is certified that error appears in the above-identified patent and that said Letters Patent is hereby corrected as shown below:

COLUMN 2

Line 53, "slowly" should read --slow--; and
Line 56, "from" should read --from a--.

COLUMN 5

Line 15, "means,." should read --means,--;
Line 40, "of" should read --of a--; and
Line 59, "partially" should read --partial--.

COLUMN 6

Line 8, "partially" should read --partial--;
Line 16, "deview" should read --device--; and
Line 33, "longer" should read --longer than--.

UNITED STATES PATENT AND TRADEMARK OFFICE

CERTIFICATE OF CORRECTION

PATENT NO. : 5,774,204

DATED : June 30, 1998

INVENTORS : KENICHI SUZUKI, ET AL.

It is certified that error appears in the above-identified patent and that said Letters Patent is hereby corrected as shown below:

COLUMN 7

Line 10, "A the" should read --The--; and
Line 15, "the heater" should read --from the heater--.

COLUMN 8

Line 58, "e" should read --be--.

COLUMN 9

Line 53, "conductive" should read --conducted--.

COLUMN 10

Line 3, "that" should read --that a--.

COLUMN 11

Line 22, "is" should read --is a--;
Line 25, "means" should read --means and--;
Line 38, "with" should read --width--; and

CERTIFICATE OF CORRECTION

PATENT NO. : 5,774,204

DATED : June 30, 1998

INVENTORS : KENICHI SUZUKI, ET AL.

It is certified that error appears in the above-identified patent and that said Letters Patent is hereby corrected as shown below:

COLUMN 11 Cont.'d

Line 50, "control" should read --controlling--.

COLUMN 12

Line 16, "he" should read --the--.

COLUMN 13

Line 2, "outside" should read --outside of--;
Line 4, "ima ging" should read --imaging--;
Line 7, "is" should read --so--;
Line 9, "o f" should read --of--;
Line 31, "include" should read --includes--; and
Line 44, "(in" should read --(in a--.

COLUMN 14

Line 16, "by" should read --by a--;
Line 23, "fore" should read --force--; and
Line 53, "non-uniformity of" should read --non-uniform--.

COLUMN 15

Line 17, "non-uniformity of" should read --non-uniform--.

UNITED STATES PATENT AND TRADEMARK OFFICE

CERTIFICATE OF CORRECTION

PATENT NO. : 5,774,204

DATED : June 30, 1998

INVENTORS : KENICHI SUZUKI, ET AL.

It is certified that error appears in the above-identified patent and that said Letters Patent is hereby corrected as shown below:

COLUMN 16

Line 42, "not" should read --not to--.

COLUMN 17

Line 16, "ad" should read --and--; and
Line 26, "an" should read --and--.

COLUMN 18

Line 3, "In" should read --In a--.

COLUMN 19

Line 14, "separate" should read --separated--.

Signed and Sealed this

Sixteenth Day of March, 1999

*Attest:*

Q. TODD DICKINSON

*Attesting Officer*

*Acting Commissioner of Patents and Trademarks*